(12) United States Patent
Suginobe (10) Patent No.: US 8,034,319 B2
(45) Date of Patent: Oct. 11, 2011

(54) METHOD FOR PRODUCING COMPLEX OXIDE OF METAL

(75) Inventor: Hidetaka Suginobe, Chiba (JP)

(73) Assignee: JFE Mineral Co., Ltd., Tokyo (JP)

( * ) Notice: Subject to any disclaimer, the term of this patent is extended or adjusted under 35 U.S.C. 154(b) by 1018 days.

(21) Appl. No.: 10/557,140

(22) PCT Filed: May 28, 2004

(86) PCT No.: PCT/JP2004/007753
§ 371 (c)(1),
(2), (4) Date: Nov. 17, 2005

(87) PCT Pub. No.: WO2004/106230
PCT Pub. Date: Dec. 9, 2004

(65) Prior Publication Data
US 2006/0275202 A1 Dec. 7, 2006

(30) Foreign Application Priority Data
May 30, 2003 (JP) .................................. 2003-154410
May 18, 2004 (JP) .................................. 2004-147898

(51) Int. Cl.
*C01D 1/02* (2006.01)
(52) U.S. Cl. .................................. 423/594.2; 423/594.4
(58) Field of Classification Search ............... 423/594.2, 423/594.4, 594.6, 594.15, 594.16
See application file for complete search history.

(56) References Cited

U.S. PATENT DOCUMENTS

| 3,320,024 A | 5/1967 | Burweli |
| 5,795,537 A | 8/1998 | Senna et al. |
| 5,846,505 A | 12/1998 | Saegusa |

FOREIGN PATENT DOCUMENTS

| EP | 0 011 475 B1 | | 5/1980 |
| EP | 0011475 | * | 5/1980 |
| GB | 1 352 978 | | 5/1974 |
| JP | A-48-038817 | | 6/1973 |
| JP | A-55-089446 | | 7/1980 |
| JP | A-08-208226 | | 8/1996 |
| JP | A-09-052773 | | 2/1997 |
| JP | A-11-071111 | | 3/1999 |
| JP | A-11-310442 | | 11/1999 |
| JP | A-2001-011549 | | 1/2001 |
| JP | A-2001-519751 | | 10/2001 |
| JP | A-2003-335523 | | 11/2003 |
| WO | WO 96/40586 A1 | | 12/1996 |

* cited by examiner

*Primary Examiner* — Edward Johnson
(74) *Attorney, Agent, or Firm* — Oliff & Berridge, PLC (57) ABSTRACT

A process for producing a complex oxide containing the valuable metal and an alkali (earth) metal salt, which comprising co-milling a mixture of the valuable metal oxide and/or a precursor thereof, or a mixture of a substance containing the valuable metal oxide and/or a precursor thereof, with an alkali (earth) metal salt to a particle size of the valuable metal oxide or a substance containing the oxide, of 10 μm or less, and heating the co-milled product to a temperature of at least 200° C. so as to induce a solid-phase reaction of the valuable metal oxide with an alkali (earth) metal salt.

18 Claims, 9 Drawing Sheets

METHOD FOR PRODUCING COMPLEX OXIDE OF METAL

TECHNICAL FIELD

The present invention relates to a process for preparing a complex oxide of a metal with an alkali metal and/or alkaline earth metal by carrying out a solid-phase reaction between the oxide of a metal and/or a precursor thereof, or a substance containing the metal oxide and/or a substance containing the precursor thereof, with an alkali metal salt and/or an alkaline earth metal salt.

BACKGROUND ART

The content of metal oxides and/or their precursors present in base ore, refined ore, incinerator ash and the like is at most several percent by mass. For example, one known process for recovering vanadium oxide from base ore containing such a small amount of vanadium oxide involves roasting the vanadium oxide-containing ore for several hours together with soda ash (sodium carbonate) in an oxidizing atmosphere at an elevated temperature of 900 to 1200° C. to form sodium vanadate, extracting the sodium vanadate with water to obtain an aqueous solution of sodium vanadate, then additionally refining to ultimately yield vanadium oxide (U.S. Pat. No. 3,320,024).

However, in this method of recovery, heating the several percent by weight or less of vanadium oxide within the ore for a long period of time at an elevated temperature of about 1000° C. requires a large amount of energy. Additional problems include the large scale of the equipment needed, high investment costs, and the strict specifications for high-temperature durability of the facility. Moreover, because this process involves a high-temperature reaction with an alkali, the bricks making up the equipment undergo alkali corrosion, so that maintenance is difficult (JP 2001-519751 A).

Likewise, in the preparation of a complex oxide by roasting chromium ore containing several tens of percent by weight of chromium oxide together with an alkali metal compound, because it is necessary to heat the alkali metal compound to 1000 to 1200° C., problems like those in the case of vanadium oxide similarly exist (JP 48-38817 A).

A process has been proposed for reacting tungsten oxide-containing wolframite or scheelite with an alkali metal compound at 500 to 800° C. to obtain water-soluble tungsten valuables which are then extracted with water. However, this process has a low yield, in addition to which it is necessary to heat and re-react the extraction residue (JP 55-89446 A)

Mechanochemical treatment, which refers to reaction processes that do not involve heating, are also known. Such treatment is typically carried out by applying mechanical energy to a solid substance such as by shearing, compression, impact, grinding, bending, stretching, then influencing the chemical state such as by bringing about chemical changes in gaseous and liquid substances located near the solid substance, or by directly inducing, or promoting, chemical changes between these gaseous and liquid substances and the surface of the solid substance. Various treatment methods of this type have been described.

For example, JP 11-71111 A describes a method for the extraction of rare-earth metal-containing substances in which a rare earth metal-containing substance is mechanochemically treated in a planetary mill, then leached with a low-concentration acid.

JP 2001-11549 A discloses an indium-containing compound leaching process which involves subjecting an indium-containing compound to mechanochemical treatment in the presence of a ceramic powder, then leaching the compound with a low-concentration acid at ambient temperature.

In addition, JP 11-310442 discloses a process in which calcium oxide is mixed with coal ash and mechanochemically treated, thereby producing a hydraulic treated product in powder form.

However, because mechanochemical treatment is based on the promotion of reactions by point contact at active sites on solid substance surfaces renewed by mechanical action such as impact, increasing the amount of reaction that takes place (i.e., the amount of product) requires that a means be employed for continuing such treatment over a long period of time so as to repeatedly renew the surface. Hence, this approach is fundamentally unsuitable for production on an industrial scale.

DISCLOSURE OF THE INVENTION

I have found that, although mechanochemical treatment does contain major problems in terms of productivity, if such treatment is applied to a reaction between an oxide of a value metal and an alkali or alkaline earth metal salt, then the product of such treatment is heated to a specific temperature, the reaction will proceed at a higher than expected rate. That is, as a result of extensive investigations I conducted on ways for employing the merits of mechanochemical treatment to increase productivity, I have discovered that by heating an alkali metal or alkaline earth metal salt which has been brought into contact and is present together with the solid surfaces of an oxide of such a value metal that has been rendered into fine particles by mixing and grinding to renew the surface, the alkali metal or alkaline earth metal salt diffuses from the solid surface to the interior of the value metal oxide, vastly increasing opportunities for contact (i.e., opportunities for reaction) between the value metal oxide and the alkali metal or alkaline earth metal salt even at the interior of the solid, thus increasing the reaction rate and lowering the starting temperature of the reaction compared with prior-art methods. Hence, at the same temperature, the amount of reaction that takes place is greater, resulting in a higher productivity than in the prior art.

BEST MODE FOR CARRYING OUT THE INVENTION

In a first aspect, the present invention provides a process for preparing a complex oxide of at least one metal selected from among elements of Periodic Table groups 13, 4, 5, 6 and 7, cobalt and nickel with an alkali metal and/or alkaline earth metal, which process comprises reacting an oxide of at least one metal selected from the group consisting of elements of Periodic Table groups 13, 4, 5, 6 and 7, cobalt and nickel and/or a precursor of the metal oxide, or a substance containing the metal oxide and/or precursor thereof, with an alkali metal salt and/or alkaline earth metal salt. The process is characterized by co-milling a mixture of the metal oxide and/or a precursor thereof, or a mixture of a substance containing the metal oxide and/or a precursor thereof, with an alkali metal salt and/or alkaline earth metal salt to a particle size for the metal oxide and/or precursor thereof, or for the metal oxide and/or precursor-containing substance, of 10 μm or less, and heating the co-milled product to a temperature of at least 200° C. so as to induce a solid-phase reaction.

Preferably, the inventive process for preparing a complex oxide includes the step to extract the complex oxide of at least one metal selected from among elements of Periodic Table groups 13, 4, 5, 6 and 7, cobalt and nickel with an alkali metal and/or alkaline earth metal from the complex oxide-containing reaction product, and thereby recover the complex oxide in the aqueous solvent.

In the inventive process for preparing a complex oxide, the metal oxide-containing substance is preferably base ore, refined ore, incinerator ash, industrial waste or non-industrial waste.

In the inventive process for preparing a complex oxide, the precursor of the metal oxide is preferably a ferroalloy, alloy, salt or sulfate of the metal.

In the inventive process for preparing a complex oxide, the metal in the metal oxide is preferably vanadium, zirconium, niobium, nickel or tungsten.

In the inventive process for preparing a complex oxide, the alkali metal salt and/or alkaline earth metal salt is preferably a carbonate, a halide, a sulfate, a borate or a hydroxide.

In the inventive process for preparing a complex oxide, the alkali metal salt and/or alkaline earth metal salt is preferably sodium carbonate, potassium carbonate, sodium sulfate, calcium carbonate or sodium hydroxide.

In the inventive process for preparing a complex oxide, the reaction of the metal oxide and/or a precursor of the metal oxide, or a substance containing the metal oxide and/or precursor thereof, with an alkali metal salt and/or alkaline earth metal salt is preferably carried out at a temperature of at least 250° C. but below the decomposition point or melting point, whichever is lower, of the alkali metal salt and/or alkaline earth metal salt.

The invention is described more fully below.

The grinding equipment used in the invention is not subject to any particular limitation with regard to type or construction, provided it is capable of grinding the oxide of a value metal and/or a precursor thereof, or a substance containing the metal oxide and/or precursor thereof, to a particle size of 10 μm or less. Illustrative examples include kneaders such as pressurizing kneaders and two-roll mills, as well as vibratory mills and rotating ball mills. A vibratory mill is preferred.

The milling conditions vary empirically according to the apparatus used. If a vibratory mill is used, for example, the amplitude of the vibrations will vary by carring out as a batch type or continuous operation. Also, the amplitude of the vibrations will differ with the pot capacity, although the driving force is generally set to a level that provides a frequency somewhat over 10 Hz. Therefore, the feedstock, alkali metal or alkaline earth metal salt, grinding balls and the like are placed in the pot, the degree of packing by the charge is adjusted according to the properties of the feedstock, and the conditions are set so that the co-milling time needed to achieve the target particle size is about 30 minutes to 8 hours. Unless milling is carried out to a feedstock particle size having a median of 10 μm or less, and preferably 5 μm or less, the surface of the feedstock will have few active sites and the amount of alkali metal or alkaline earth metal salt that comes into contact with such active sites will be small. As a result, the solid-phase reaction between the feedstock and the alkali metal or alkaline earth metal salt at the feedstock surface does not proceed to a sufficient degree during co-milling, and a stable interface does not form. When such a co-milled product is then heated, because a stable interface has not formed, the alkali metal or alkaline earth metal salt does not readily penetrate to the interior of the feedstock, in addition to which the distance the salt must move to the feedstock interior increases. Hence, this solid-phase reaction fails to proceed to an adequate degree. It is thus critical that co-milling be carried out to a feedstock particle size having a median of 10 μm or less, and preferably 5 μm or less.

The median is the particle size which is the center value of the mass-based particle size distribution for the feedstock. In the case of a finely divided powder like the feedstock in the invention, the mass-based particle size distribution can be obtained by the laser diffraction technique. The median can be defined here as the particle size which is the center value in this particle size distribution.

The value metal oxide of concern in the invention is an oxide of at least one metal selected from among elements of Periodic Table groups 13, 4, 5, 6 and 7, cobalt and nickel and/or a precursor thereof, or a substance containing the metal oxide and/or the precursor thereof.

Group 13 metals include gallium, indium and thallium, group 4 metals include zirconium, group 5 metals include vanadium, niobium and tantalum, group 6 metals include chromium, molybdenum and tungsten, and group 7 metals include technetium and rhenium.

Examples of the value metal oxide-containing substance of concern in the invention include base ore, refined ore, incinerator ash, industrial waste and non-industrial waste. Exemplary base ores include vanadium-containing ore, chromium-containing ore, zircon-containing ore, niobium-containing ore, nickel-containing ore and tungsten-containing ore. Exemplary refined ores include enriched forms of such minerals in these base ores as vanadate-containing ore, chrome iron ore, zircon, scheelite, garnierite, magnetite and wolframite. Industrial wastes include soot, slag, spent catalyst, scrap, coal ash and wastes such as from electronic parts and materials.

Precursors of the above oxides of value metals are compounds which can be converted into the oxide of a value metal. Such compounds include ferroalloys, alloys, metal salts and sulfates. Exemplary metal salts include carbonates, halides, sulfates, borates, silicates, aluminate and hydroxides. Exemplary alloys include ferrotungsten, ferroniobium, ferrovanadium, ferronickel and ferromolybdenum. For example, to obtain a complex oxide of niobium, a ferroniobium alloy which is about two-thirds niobium is preferred.

Examples of the alkali metal salt and/or alkaline earth metal salt which is reacted with the oxide of a value metal in the invention include carbonates, halides, sulfates and borates. For the sake of convenience, as used herein, "metal salts" includes also hydroxides and oxides. Of course, mixtures of these can also be used. Some metal salts, particularly alkaline earth metal salts, decompose before they melt. However, if the products of such decomposition are in an active state, they can fully function as the reactant in the invention in the same way as a melt. Decomposable carbonates and hydroxides are preferred.

The alkali metal is preferably sodium or potassium, and the alkaline earth metal is preferably calcium.

Specific examples of the alkali metal salt and/or alkaline earth metal salt include carbonates such as sodium carbonate, potassium carbonate, lithium carbonate and calcium carbonate; hydroxides such as sodium hydroxide and potassium hydroxide; bicarbonates such as sodium bicarbonate; halides such as sodium chloride and lithium fluoride; and borates such as sodium borate and sodium metaborate. Sodium carbonate and potassium carbonate are especially preferred.

The alkali metal or alkaline earth metal salt is used in at least a stoichiometric amount that reacts with the oxide of the value metal to form the complex oxide. The molar ratio varies with the intended complex oxide. For example, to obtain a complex oxide of a specific composition using one type of metal salt and one type of value metal oxide, these are typically mixed in amounts representing the stoichiometric ratio and co-milled, then reacted. Also, to efficiently obtain the desired complex oxide from the compounds in a complex system such as a refined ore and achieve a higher reaction efficiency at the time of extraction and recovery, it is preferable to use an amount of the alkali metal or alkaline earth metal salt which is 1.2 to 3 times the stoichiometric ratio with respect to the value metal oxide included therein.

In the practice of the invention, after co-milling of the feedstock has been completed, the co-milled product is either heated within the milling apparatus or is removed and heated. Heating promotes diffusion of the metal salt or its decomposition products from the solid surface into the solid interior of the co-milled product (i.e., the value metal oxide), and so presumably the solid-phase reaction proceeds not only at the surface of the value metal oxide but also at the interior therein.

Because heating is carried out to promote diffusion of the alkali or alkaline earth metal salt or its decomposition products from the solid surface to the solid interior of the co-milled value metal oxide, it is preferable to promptly carry out such heating after co-milling. Yet, even if the time until the start of heating after co-milling is extended, the completion time for the solid-phase reaction that forms the complex oxide merely increases by the same amount; from the standpoint of operational control, all that is required is suitable control of the heating step. In certain cases, however, such as when a deliquescent alkali metal or alkaline earth metal salt is used, if co-milling is followed by a long interval of time before the start of heating, the complex oxide may take longer to form. In extreme cases, the solid-phase reaction may even fail to proceed. Accordingly, it is desirable to carry out process control suitable for the feedstock and the alkali or alkaline earth metal salt.

The heating method is not subject to any particular limitation. For example, one simple and expedient method is to place the co-milled product in an ordinary electrical furnace and electrically heat it. Other suitable heating methods include that of passing a hot draft through a furnace in which the co-milled product has been loaded, and a radiant heating method that involves externally heating the walls of a furnace in which the co-milled product has been placed.

The heating temperature may be set as appropriate for the type of value metal oxide. However, at less than 200° C., diffusion within the solid takes time, which is undesirable for industrial use. Hence, heating must be carried out to at least 200° C., and preferably at least 250° C. It is essential for the upper limit in the heating temperature to be less than the decomposition temperature or the melting temperature, whichever is lower, of the alkali metal salt and/or alkaline earth metal salt. Heating to a higher temperature than this entails the application of unnecessary thermal energy, which is economically disadvantageous and moreover causes the alkali metal salt and/or alkaline earth metal salt to volatize or melt rather than remaining in a solid state, thus inviting such undesirable effects as alkali corrosion of the furnace or the deposition of reaction products.

If the feedstock contains various impurities, a complex oxide which includes the impurities admixed therein will be obtained as the final product.

If the complex oxide obtained by the solid-phase reaction is water-soluble, in accordance with common practice, the complex oxide can be separated and recovered by adding, to the solid-phase reaction product after heating, an aqueous solvent so as to render the complex oxide into an aqueous solution, then carrying out extraction and filtering the extract. To increase the extraction concentration and efficiently carry out extraction, it is desirable to take the temperature dependence of the complex oxide solubility into account and set the extraction temperature so as to obtain a high-concentration solution.

If the complex oxide obtained by the solid-phase reaction is insoluble, in accordance with common practice, the complex oxide can be separated and recovered by dissolving and removing substances other than the complex oxide with an acid or an alkali.

The complex oxide that has been recovered is reduced, first to the oxide of the value metal therein, then to the value metal, in accordance with standard practice.

Examples are given below to illustrate the invention, but should not be construed as limitative of the invention. In the examples, the extraction ratio for a complex oxide is calculated as follows.

Extraction ratio of complex oxide=[(amount of value metal in filtrate)/(amount of value metal in filtrate+amount of value metal in residue)]×100

EXAMPLE 1

Vanadium-containing magnetite was electromagnetically separated, giving a refined ore which had a lower level of gangue minerals such as silica and alumina and the elemental composition, as determined by the inductively-coupled plasma (ICP) method, shown in Table 1 (excluding oxygen; in mass %). After first being coarsely ground to a particle size of 0.3 mm or less, this refined ore was ground for 10 minutes in a rotating ball mill (model JIS-M=4002, manufactured by Yoshida Seisakusho Co., Ltd.). The powder having a particle size of 300 μm or more obtained by screening the product was again ground. This grinding operation was repeated until none of the powder had a particle size of 300 μm or more, yielding a ground refined ore having a median particle size of 32.3 μm. The median particle size was determined with a laser diffraction-type particle size analyzer (HR850B, manufactured by Cilas). This was done by adding 1 g of the ground refined ore and 0.05 g of sodium hexametaphosphate as a dispersant to 400 ml of ion-exchanged water, carrying out dispersion for 5 minutes in an ultrasonic homogenizer, then measuring the particle size in a quartz cell.

TABLE 1

| | Component | | | | | | |
|---|---|---|---|---|---|---|---|
| | Fe | Ti | V | Mg | Al | Si | Mn |
| Content | 63.2 | 2.2 | 1.71 | 0.09 | 0.85 | 0.51 | 0.13 |

Four hundred grams of the ground refined ore and 40 g of sodium carbonate were co-milled for 90 minutes at an amplitude of 4 mm and an operating speed of 1200 rpm in a vibratory mill (Vibropot YAMP-6SND, manufactured by Murakami Seiki Mfg. Co., Ltd.) to which had been added 280 alumina balls (diameter, 10 mm). The mixture of refined ore and sodium carbonate obtained by co-milling had a particle size, expressed as the median particle size, of 4.3 μm.

Next, 100 g of the co-milled mixture was placed in a muffle furnace and heated for 1 hour in an open-air atmosphere at 600° C. to effect a solid-phase reaction between the oxide of vanadium and the sodium carbonate, after which cooling was carried out. Fifty grams of the cooled reaction product and 200 ml of boiling water (pure water) were then placed in a flask equipped with a condenser and stirred for 45 minutes with a stirrer while being heated at 90° C. on a mantle heater, thereby extracting the compl The process for preparing a complex oxide according to claim 1, wherein the process includes the step to extract the complex oxide of at least one metal selected from among elements of Periodic ex oxide of vanadium. Following the completion of extraction, the extract was suction filtered while still hot with 5C filter paper. The filtration residue was washed four times with boiling water. The filtrate was recovered, placed in a 250 ml graduated flask, and brought up to 250 ml by adding pure water.

The weight change for 50 mg of the mixture of refined ore and sodium carbonate obtained by co-milling was measured with a thermobalance under a 200 ml/min stream of air and at a ramp-up rate of 10 K/min. The results are shown as a plot (FIG. 1) of temperature on the x-axis versus the weight on the y-axis at left and the differential thermocouple output on the y-axis at right. From FIG. 1, it is apparent that the decrease in weight of the mixture after co-milling ends at about 600° C. and an endotherm appears at the same time. This suggests that a reaction accompanied by carbon dioxide removal from the sodium carbonate occurs up to about 600° C.

The concentrations of vanadium in the filtrate and the residue were measured by the ICP method, and the absolute amounts of vanadium in the residue and the filtrate were computed from these concentrations and the residue mass and liquid volume (250 ml) to be respectively 35 mg and 696 mg. The vanadium extraction ratio was calculated from the above formula, giving a high extraction ratio of 95.2%.

Figure 1:
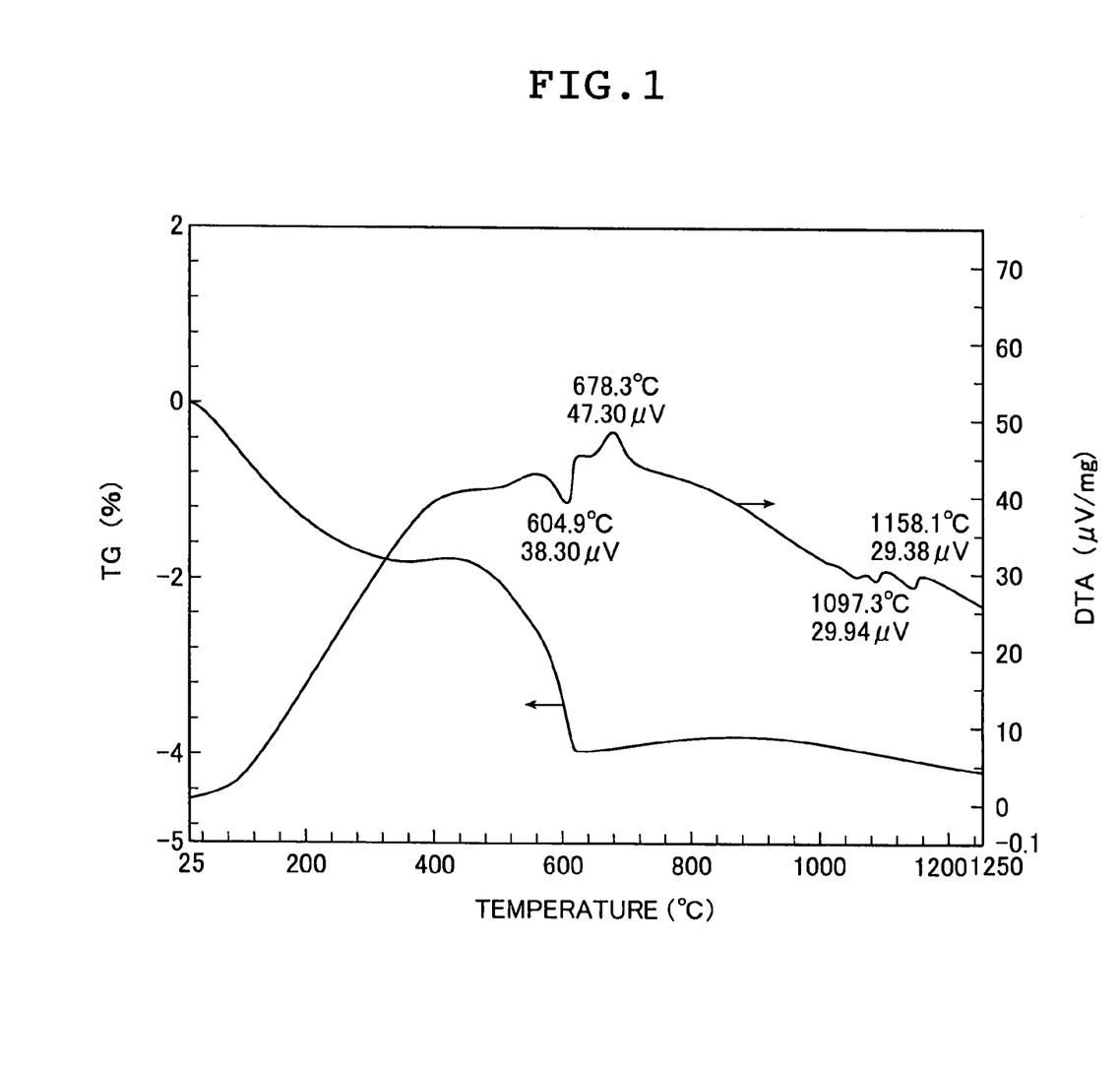
FIG. 1 shows the thermal analysis results obtained for co-milled vanadium-containing magnetite in Example 1 according to the invention.

The extraction of vanadium to a high ratio was due to the formation of sodium metavanadate $NaVO_3$, which is a water-soluble complex oxide. Presumably, the following solid-phase reaction accompanied by carbon dioxide removal took place up to 600° C.

$$V_2O_5 + Na_2CO_3 \rightarrow 2NaVO_3 + CO_2$$

EXAMPLE 2

A ferroniobium alloy having the elemental composition shown in Table 2 (excluding oxygen; in mass %), as determined by the ICP method, was first coarsely ground to a particle size of 0.3 mm or less, then ground using the vibratory mill described in Example 1 until the portion of the material having an average particle size of 200 mesh (75 μm) or less accounted for 50 wt % of the overall material, thereby giving a ground ferroniobium alloy having a median particle size of 71.0 μm.

Figure 2:
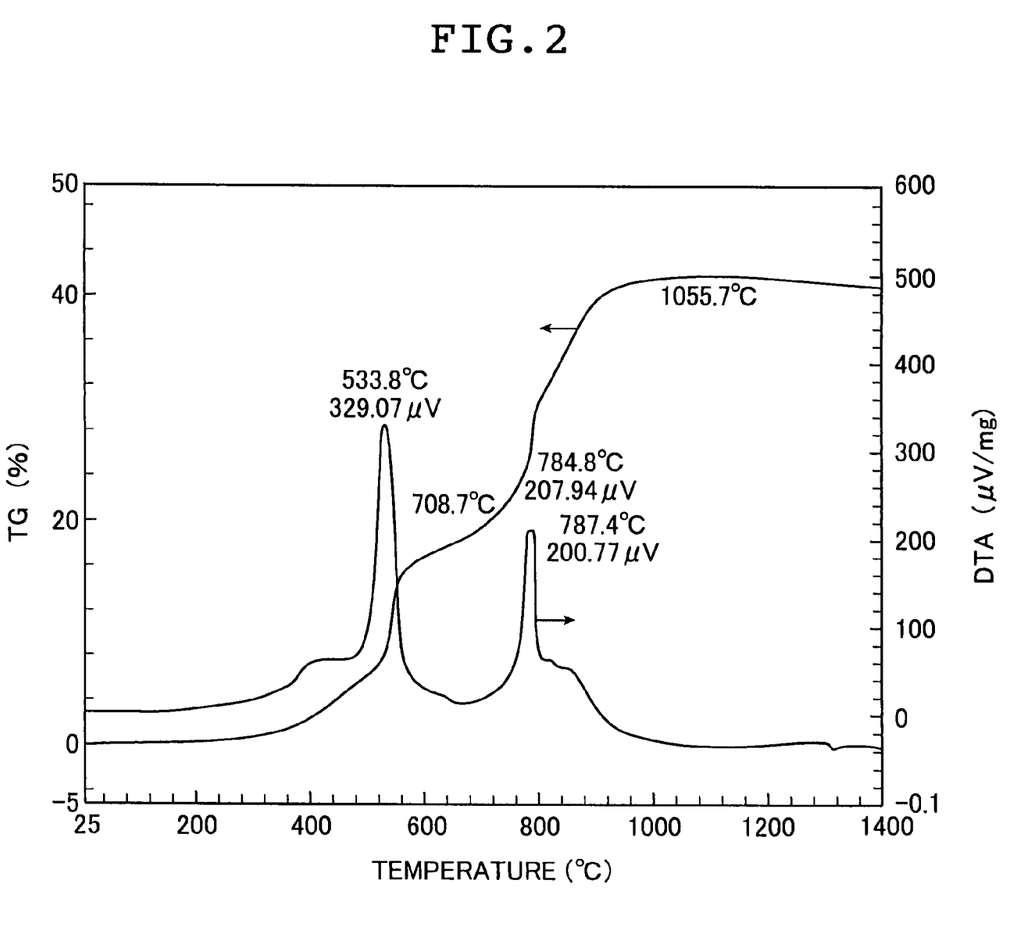
FIG. 2 shows the thermal analysis results obtained for milled ferroniobium alloy in Example 2 according to the invention.

The mass change for 50 mg of the ground ferroniobium alloy was measured with a thermobalance under a 200 ml/min stream of air and at a ramp-up rate of 10 K/min. The results are shown as a plot (FIG. 2) of temperature on the x-axis versus the mass on the y-axis at left and the differential thermocouple output on the y-axis at right. From FIG. 2, it is apparent that the rise in weight of the ferroniobium alloy stops and oxidation ends at about 900° C.

TABLE 2

| | Component | | | | | | |
|---|---|---|---|---|---|---|---|
| | Nb | Fe | Si | Al | Ta | P | S |
| Content | 66.3 | 29.8 | 0.15 | 1.12 | 0.02 | 0.07 | 0.08 |

Next, 300 g of the ground ferroniobium alloy was placed in a muffle furnace, heated for 1 hour at 950° C. under a stream of air, then cooled. The cooled product was subjected to x-ray diffraction analysis, confirming that the ferroniobium alloy had converted into iron niobate $FeNbO_4$.

Four hundred grams of the cooled iron niobate-containing mixture and 40 g of sodium carbonate were co-milled for 90 minutes at an amplitude of 4 mm and an operating speed of 1200 rpm in the above-described vibratory mill to which had been added 280 alumina balls (diameter, 19 mm). The mixture of the iron niobate-containing mixture and sodium carbonate obtained by co-milling had a particle size, expressed as the median particle size, of 3.3 μm.

The mass change for 50 mg of the mixture of the iron niobate-containing mixture and sodium carbonate obtained by co-milling was measured with a thermobalance under a 200 ml/min stream of air and at a ramp-up rate of 10 K/min. The results are shown as a plot (FIG. 3) of temperature on the x-axis versus the mass on the y-axis at left and the differential thermocouple output on the y-axis at right. From FIG. 3, it is apparent that the decrease in mass of the mixture starts at about 400° C. and ends at 780° C., and that an endotherm appears at the same time at 780° C.

Next, 100 g of the co-milled mixture of the iron niobate-containing mixture and sodium carbonate was placed in a muffle furnace and heated for 1 hour in an open-air atmosphere at 800° C. to effect a solid-phase reaction between the oxide of niobium and the sodium carbonate, after which cooling was carried out. After cooling, the solid-phase reaction product was subjected to x-ray diffraction analysis, from which it was confirmed to contain the complex oxide sodium metaniobate $NaNbO_3$. The sodium metaniobate was extracted with water to an extraction ratio of 94.7%.

From the above, the following solid-phase reaction is presumed to have taken place, forming sodium metaniobate.

$$2FeNbO_4 + Na_2CO_3 \rightarrow 2NaNbO_3 + Fe_2O_3 + CO_2$$

EXAMPLE 3

Two hundred grams of the cooled iron niobate-containing mixture from Example 2 and 200 g of sodium carbonate were co-milled for 120 minutes at an amplitude of 4 mm and an operating speed of 1200 rpm in the vibratory mill described in

Example 1 to which had been added 280 alumina balls (diameter, 19 mm). The mixture of the iron niobate-containing mixture and sodium carbonate obtained by co-milling had a particle size, expressed as the median particle size, of 2.5 μm.

Figure 3:
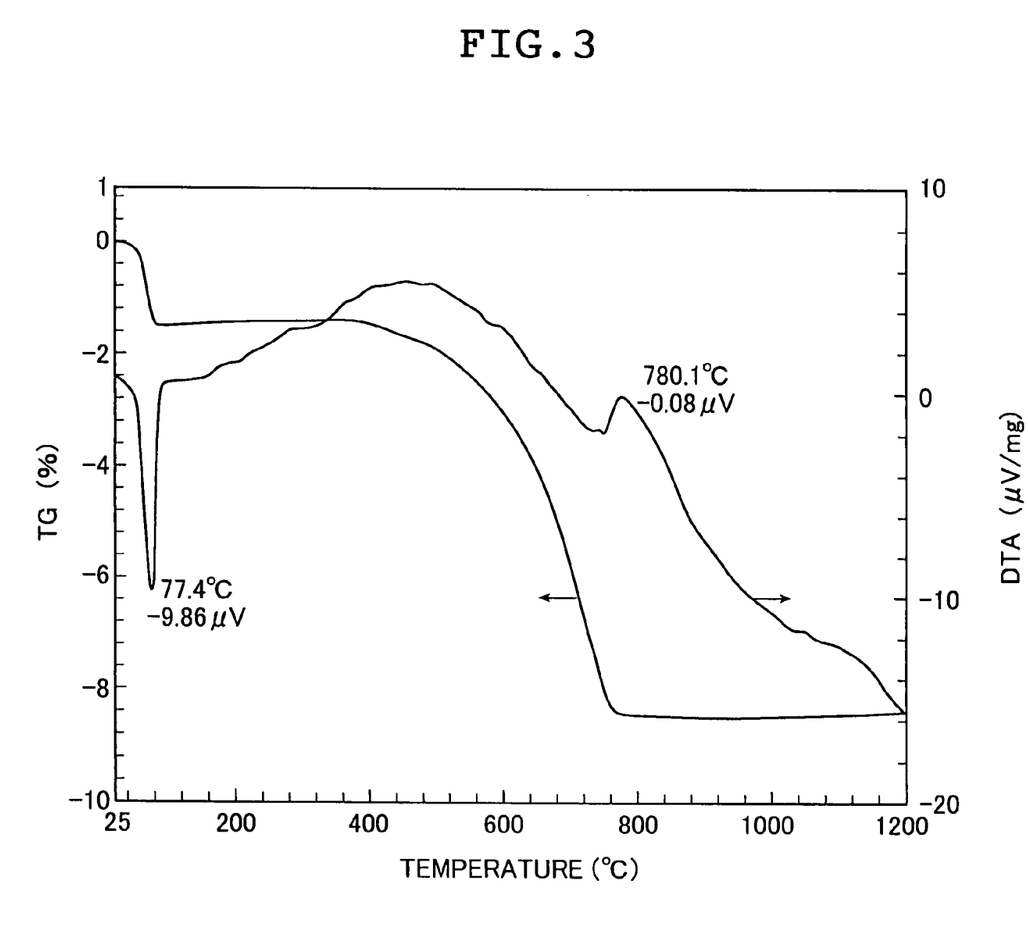
FIG. 3 shows the thermal analysis results obtained for co-milled iron niobate in Example 2 according to the invention.
Figure 4:
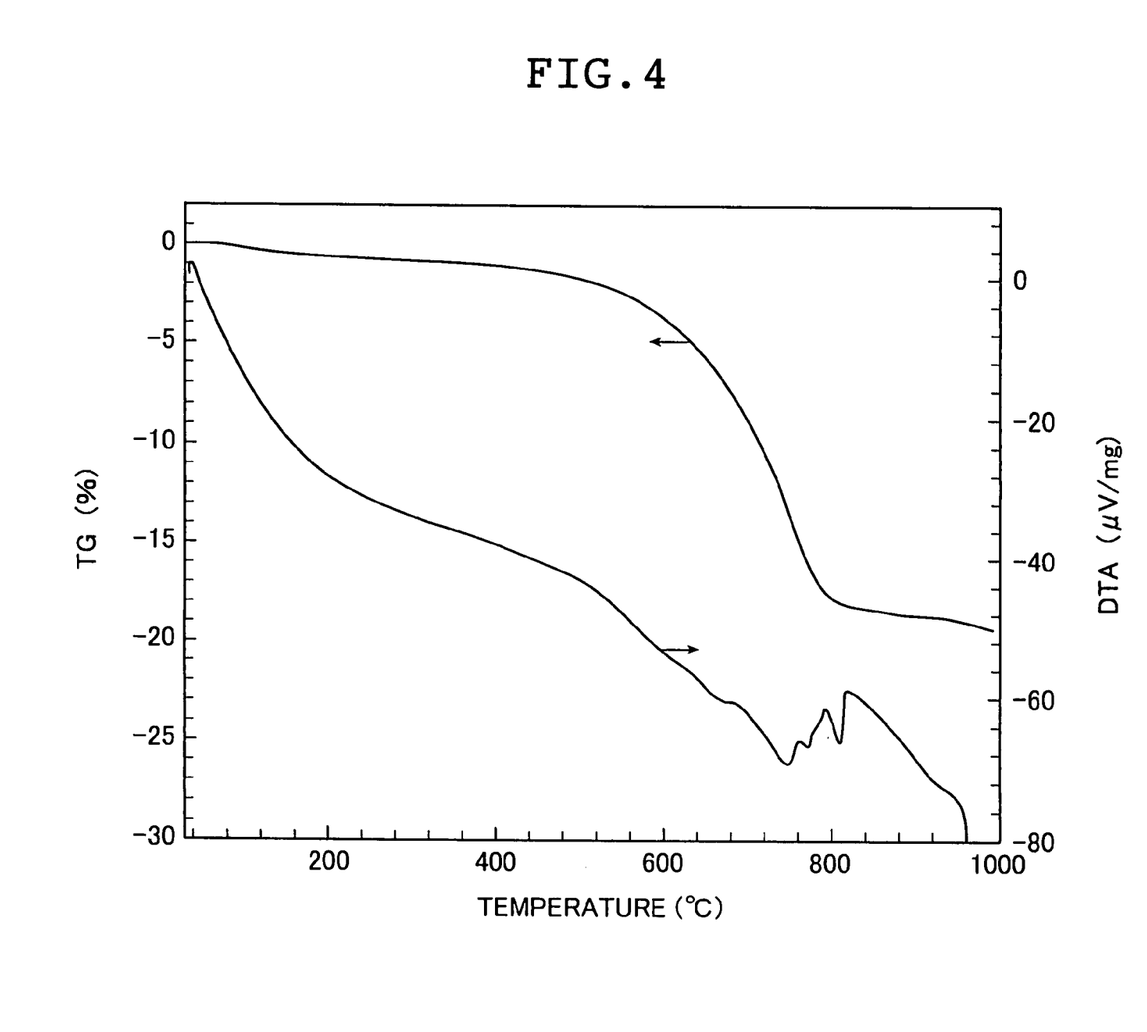
FIG. 4 shows the thermal analysis results obtained for co-milled iron niobate in Example 3 according to the invention.

The mass change for 50 mg of the mixture of the iron niobate-containing mixture and sodium carbonate obtained by co-milling was measured with a thermobalance under a 200 ml/min stream of air and at a ramp-up rate of 10 K/min. The results are shown as a plot (FIG. 4) of temperature on the x-axis versus the mass on the y-axis at left and the differential thermocouple output on the y-axis at right. From FIG. 4, it is apparent that the mass loss by the mixture starts at about 400° C. and ends at 800° C., and that an exotherm appears at the same time at 800° C. In addition, the exotherm is accompanied by an endotherm. In Example 2, as can be seen in FIG. 3, there is only an exotherm. Hence, in Example 3, some sort of phase change apparently occurs.

Next, 100 g of the co-milled mixture containing the iron niobate-containing mixture and sodium carbonate was placed in a muffle furnace and heated for 1.5 hours in an open-air atmosphere at 800° C. so as to effect a solid-phase reaction between this iron niobate $FeNbO_4$ and the sodium carbonate, after which cooling was carried out. After cooling, the solid-phase reaction product was subjected to x-ray diffraction analysis, from which the formation of sodium orthoniobate $Na_3NbO_4$, which is a complex oxide of niobium, was confirmed. Two grams of the cooled solid-phase reaction product and 200 ml of boiling water (pure water) were placed in a flask equipped with a condenser and stirred with a stirrer for 60 minutes while being heated at 90° C. on a mantle heater, thereby carrying out extraction of the sodium orthoniobate. Following completion of the extraction, the extract was suction filtered with 5C filter paper. The filtration residue was washed four times with boiling water. The filtrate was recovered, placed in a 250 ml graduated flask, and brought up to 250 ml by adding pure water.

The concentrations of niobium in the filtrate and the residue were measured by the ICP method, and the absolute amounts of niobium in the residue and the filtrate were computed from these concentrations and the residue mass and volume (250 ml) to be respectively 0.06 g and 5.38 g. The niobium extraction ratio was calculated, yielding a high extraction ratio of 98.9%.

From the above, the following solid-phase reaction presumably took place, resulting in the formation of sodium orthoniobate.

$$2FeNbO_4 + 3Na_2CO_3 \rightarrow 2Na_3NbO_4 + Fe_2O_3 + 3CO_2$$

EXAMPLE 4

A wolframite-containing base ore having the elemental composition shown in Table 3 (excluding oxygen; in mass %), as determined by the ICP method, was coarsely ground to a particle size of 0.3 mm or less, then ground using the rotating ball mill described in Example 1 until the portion of the material having an average particle size of 400 mesh (36 μm) or less accounted for 80 mass % of the overall material, thereby giving a ground wolframite-containing ore having a median particle size of 52.3 μm.

Two hundred grams of the divided wolframite-containing ore and 95 g of potassium carbonate were co-milled therein for 90 minutes at an amplitude of 4 mm and an operating speed of 1200 rpm in the above-described vibratory mill to which had been added 260 iron balls (diameter, 19 mm). The ore and potassium carbonate-containing mixture obtained by co-milling had a particle size, expressed as the median particle size, of 3.9 μm.

The mass change for 50 mg of the mixture of ore and potassium carbonate obtained by co-milling was measured with a thermobalance under a 200 ml/min stream of air and at a ramp-up rate of 10 K/min. The results are shown as a plot (FIG. 5) of temperature on the x-axis versus the mass on the y-axis at left and the differential thermocouple output on the y-axis at right. The loss of mass associated with the sharp endotherm up to 100° C. is due to the evaporation of water vapor absorbed by the potassium carbonate. The loss of mass that occurs after 300° C. is due to the release of carbon dioxide from the potassium carbonate. Potassium carbonate melts at 800° C., and decomposes at temperatures above this. The mass changes in this mixture indicate that a solid-phase reaction accompanied by the removal of carbon dioxide proceeds from a surprisingly low temperature.

Next, 100 g of the co-milled ore and potassium carbonate-containing mixture was placed in a muffle furnace and heated for 2 hours in an open-air atmosphere at 400° C., then cooled. A portion of the cooled mixture was subjected to x-ray diffraction analysis, whereupon the disappearance of $(Fe,Mn)WO_4$ and the formation of the complex oxide potassium tungstate $K_2WO_4$ were noted. When this data is considered together with the results of thermal analysis, it appears that the following solid-phase reaction proceeded to completion by 400° C.

$$(Fe,Mn)WO_4 + K_2CO_3 \rightarrow (Fe,Mn)O + K_2WO_4 + CO_2$$

Fifty grams of the cooled mixture containing ore and potassium carbonate and 200 ml of boiling water (pure water) were placed in a flask equipped with a condenser and stirred with a stirrer for 30 minutes while being heated at 90° C. on a mantle heater, thereby carrying out extraction of the complex oxide of tungsten. Following the completion of extraction, the extract was suction filtered with 5C filter paper. The filtration residue was washed four times with boiling water. The filtrate was recovered, placed in a 250 ml graduated flask, and brought up to 250 ml by adding pure water.

The concentrations of tungsten in the filtrate and the residue were measured by the ICP method, and the absolute amounts of the complex oxide of tungsten in the residue and the filtrate were computed from these concentrations and the residue mass and volume (250 ml) to be respectively 0.4 g and 15.1 g. The niobium extraction ratio was calculated, yielding a high extraction ratio of 97.4%.

In addition to the results of thermal analysis and x-ray diffraction analysis, given that the tungsten was extracted with an aqueous solution, the above solid-phase reaction presumably took place, resulting in the formation of potassium tungstate.

EXAMPLE 5

A scheelite-containing base ore having the elemental composition shown in Table 4 (excluding oxygen; in mass %), as determined by the ICP method, was coarsely milled to a particle size of 0.3 mm or less, then ground using the rotating ball mill described in Example 1 until the portion of the material having an average particle size of 400 mesh (36 μm) or less accounted for 80 mass % of the overall material, thereby giving a milled scheelite-containing ore having a median particle size of 49.0 μm.

TABLE 4

| | Component | | | | | | | |
|---|---|---|---|---|---|---|---|---|
| | W | Si | Ca | Al | Fe | Mg | Na | S |
| Content | 18.3 | 19.9 | 9.11 | 3.60 | 3.68 | 0.69 | 1.09 | 0.67 |

Two hundred fifty grams of the ground scheelite-containing ore and 80 g of sodium carbonate were co-milled therein for 1 hour at an amplitude of 4 mm and an operating speed of 1200 rpm in the vibratory mill described in Example 1 to which had been added 260 iron balls (diameter, 19 mm). The mixture of scheelite-containing ore and sodium carbonate obtained by co-milling had a particle size, expressed as the median particle size, of 3.1 μm.

The mass change for 20 mg of the mixture of ore and sodium carbonate-containing mixture obtained by co-milling was measured with a thermobalance under a 200 ml/min stream of air and at a ramp-up rate of 2 K/min. The results are shown as a plot (FIG. 6) of temperature on the x-axis versus the mass on the y-axis at left and the differential thermocouple output on the y-axis at right.

Figure 6:
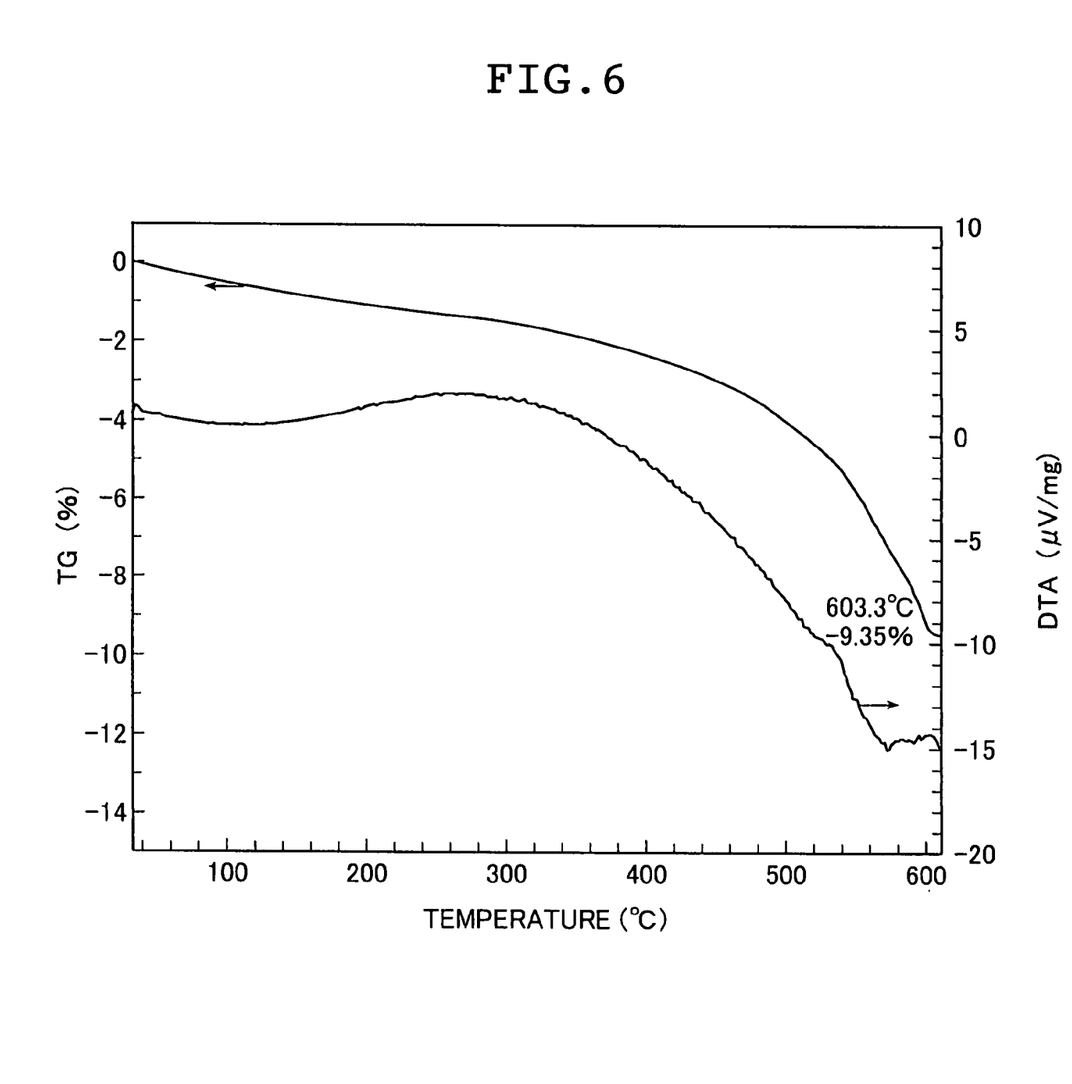
FIG. 6 shows the thermal analysis results obtained for co-milled scheelite-containing ore in Example 5 according to the invention.

The loss of mass that occurs after 400° C. is due to the release of carbon dioxide from the sodium carbonate. Sodium carbonate melts at 850° C., and decomposes at temperatures above this. The mass changes in this mixture indicate that a solid-phase reaction accompanied by the removal of carbon dioxide from the sodium carbonate proceeds from a surprisingly low temperature.

Next, 100 g of the ore and sodium carbonate-containing mixture obtained by co-milling was placed in a muffle furnace and heated for 1.5 hours in an open-air atmosphere at 600° C., then cooled. A portion of the cooled mixture was subjected to x-ray diffraction analysis, whereupon the disappearance of $CaWO_4$ and the formation of the complex oxide sodium tungstate $Na_2WO_4$ were noted. When this data is considered together with the results of thermal analysis, it appears that the following solid-phase reaction proceeded to completion by 600° C.

Fifty grams of the cooled mixture containing ore and sodium carbonate and 200 ml of boiling water (pure water) were placed in a flask equipped with a condenser and stirred with a stirrer for 30 minutes at ambient temperature, thereby carrying out extraction of the complex oxide of tungsten. Following completion of the extraction, the extract was suction filtered with 5C filter paper. The filtration residue was washed four times with boiling water. The filtrate was recovered, placed in a 250 ml graduated flask, and brought up to 250 ml by adding pure water.

The concentrations of tungsten in the filtrate and the residue were measured by the ICP method, and the absolute amounts of tungsten in the residue and the filtrate were computed from these concentrations and the residue mass and volume (250 ml) to be respectively 0.13 g and 7.83 g. The tungsten extraction ratio was calculated, yielding a high extraction ratio of 98.4%.

EXAMPLE 6

Figure 5:
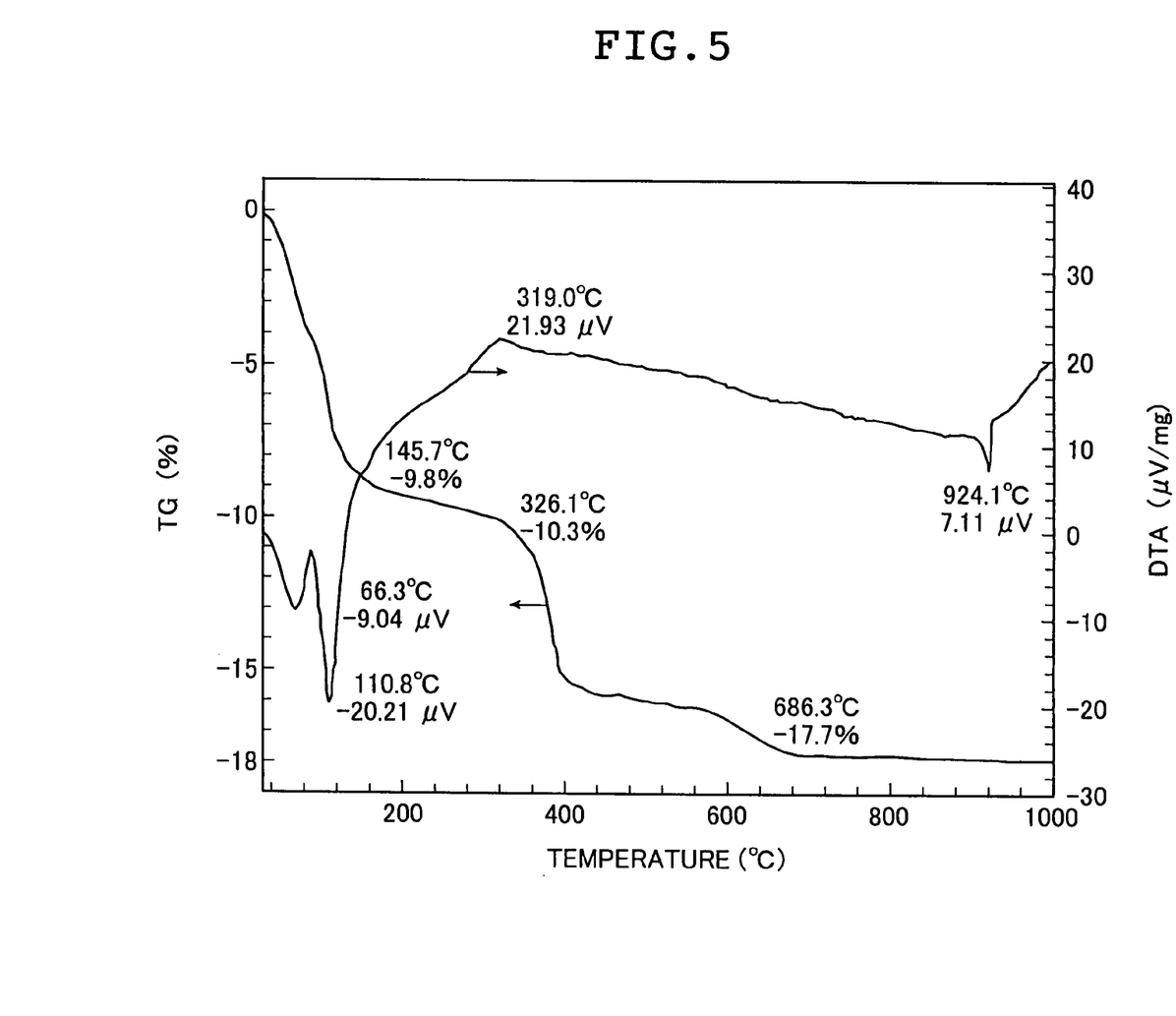
FIG. 5 shows the thermal analysis results obtained for co-milled wolframite-containing ore in Example 4 according to the invention.

A garnierite-containing base ore having the elemental composition shown in FIG. 5 (excluding oxygen; in mass %), as determined by the ICP method, was coarsely ground to a particle size of 0.3 mm or less, then ground using the rotating ball mill described in Example 1 until the portion of the material having an average particle size of 400 mesh (36 μm) or less accounted for 90 mass % of the overall material, thereby giving a ground garnierite-containing ore having a median particle size of 38.1 μm.

In addition, using a thermal analysis system with mass spectrometer (Thermo Mass, manufactured by Rigaku Corporation), 2 mg of the milled garnierite ore was heated at a ramp-up rate of 10 K/min to examine the mass loss behavior, in addition to which the emitted gas was analyzed. Given that the emission of gas substantially ended at 700° C. and the gas was composed entirely of water, it is assumed that a dehydration reaction involving conversion of the hydroxide to an oxide proceeded.

TABLE 5

| | Component | | | | | | |
|---|---|---|---|---|---|---|---|
| | Ni | Si | Ca | Al | Mg | Cr | Fe |
| Content | 4.84 | 29.6 | <0.1 | <0.1 | 10.7 | 0.23 | 3.72 |

Next, 300 g of the ground garnierite ore was placed in a muffle furnace and subjected to dehydration by heating for 2 hours in an open-air atmosphere at 700° C., then cooled. Two hundred grams of the dehydrated garnierite ore and 80 g of sodium sulfate were co-milled therein for 2 hours at an amplitude of 4 mm and an operating speed of 1200 rpm in the vibratory mill described in Example 1 to which had been added 260 iron balls (diameter, 19 mm). The mixture of garnierite ore and sodium sulfate obtained by co-milling had a particle size, expressed as the median particle size, of 2.1 μm.

The mass change for 30 mg of the mixture of garnierite ore and sodium sulfate obtained by co-milling was measured with a thermobalance under a 200 ml/min stream of air and at a ramp-up rate of 10 K/min. The results are shown as a plot (FIG. 7) of temperature on the x-axis versus the weight on the y-axis at left and the differential thermocouple output on the y-axis at right.

Figure 7:
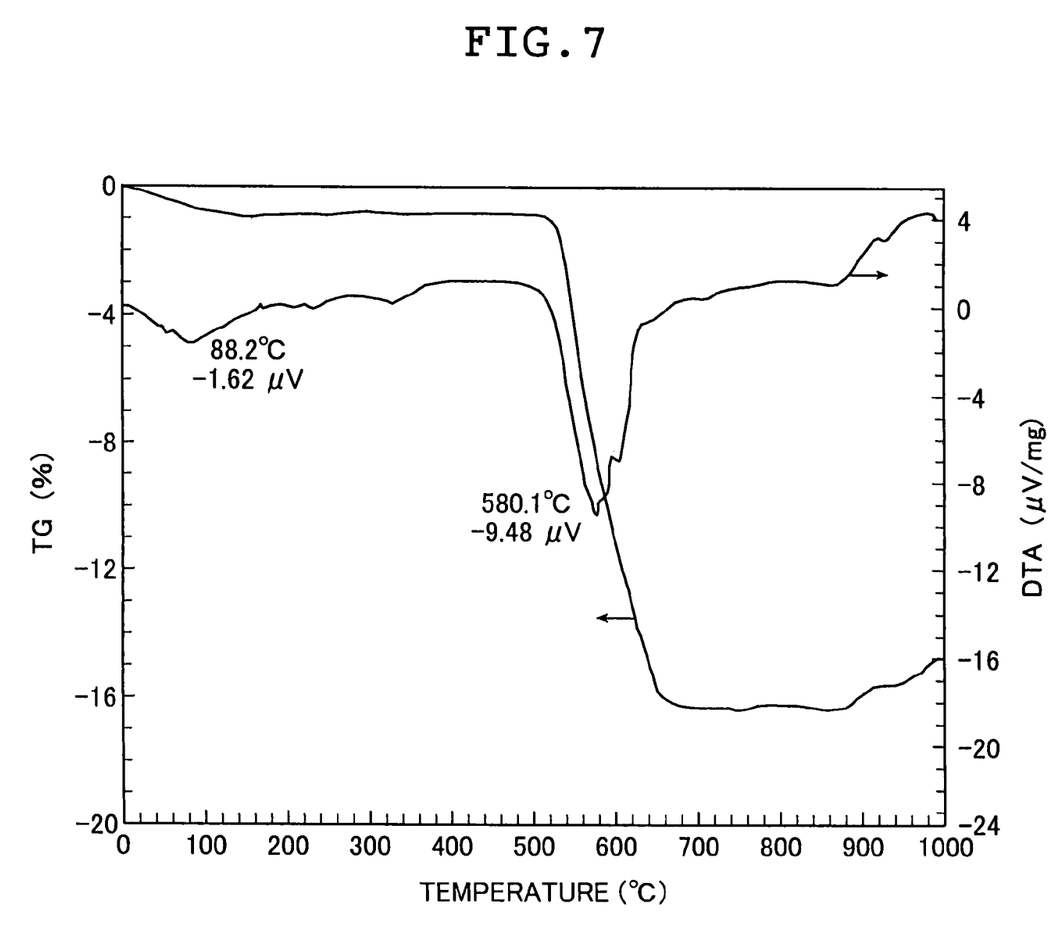
FIG. 7 shows the thermal analysis results obtained for co-milled garnierite ore in Example 6 according to the invention.

The loss of mass that occurs after 520° C. is due to the release of sulfur dioxide from the sodium sulfate. Sulfur dioxide release ends at 660° C. Sodium sulfate melts at 880° C., and decomposes at temperatures above this. The mass changes in this mixture indicate that a solid-phase reaction accompanied by the removal of sulfur dioxide from the sodium sulfate proceeds from a temperature at least 200° C. lower than the decomposition temperature for sodium sulfate by itself.

Hence, 100 g of the garnierite ore and sodium sulfate-containing mixture obtained by co-milling was placed in a muffle furnace and heated for 1 hour in an open-air atmosphere at 700° C., then cooled. A portion of the cooled mixture was subjected to x-ray diffraction analysis, whereupon formation of the complex oxide $NaNiO_2$ was noted. When this data is considered together with the results of thermal analysis, it appears that the following solid-phase reaction proceeded to completion by 700° C.

Fifty grams of the cooled mixture containing garnierite ore and sodium sulfate and 200 ml of 0.1N sulfuric acid in water were placed in a flask equipped with a condenser and stirred with a stirrer for 30 minutes at ambient temperature, thereby carrying out extraction of the complex oxide of nickel. Following completion of the extraction, the extract was suction filtered with 5C filter paper. The filtration residue was washed four times with 0.1N sulfuric acid. The filtrate was recovered, placed in a 250 ml graduated flask, and brought up to 250 ml by adding pure water.

The concentrations of nickel in the filtrate and the residue were measured by the ICP method, and the absolute amounts of nickel in the residue and the filtrate were computed from these concentrations and the residue weight and volume (250 ml) to be respectively 0.16 g and 1.95 g. The nickel extraction ratio was calculated, yielding a high extraction ratio of 92.4%.

EXAMPLE 7

One hundred fifty grams of a zircon-containing base ore (100 mass % of which had a particle size of 250 μm or less; 30 mass % of which had a particle size of 100 μm or less; median particle size, 98.2 μm) having the elemental composition shown in Table 6 (excluding oxygen; in mass %), as determined by the ICP method, and 203 g of calcium carbonate were co-milled for 2.5 hours at an amplitude of 4 mm and an operating speed of 1200 rpm in the vibratory mill described in Example 1 to which had been added 260 iron balls (diameter, 19 mm). The mixture of zircon-containing ore and calcium carbonate obtained by co-milling had a particle size, expressed as the median particle size, of 6.0 μm.

The mass change for 50 mg of the mixture of zircon-containing ore and calcium carbonate obtained by co-milling was measured with a thermobalance under a 200 ml/min stream of air and at a ramp-up rate of 10 K/min. The results are shown as a plot (FIG. 8) of temperature on the x-axis versus the mass on the y-axis at left and the differential thermocouple output on the y-axis at right.

Figure 8:
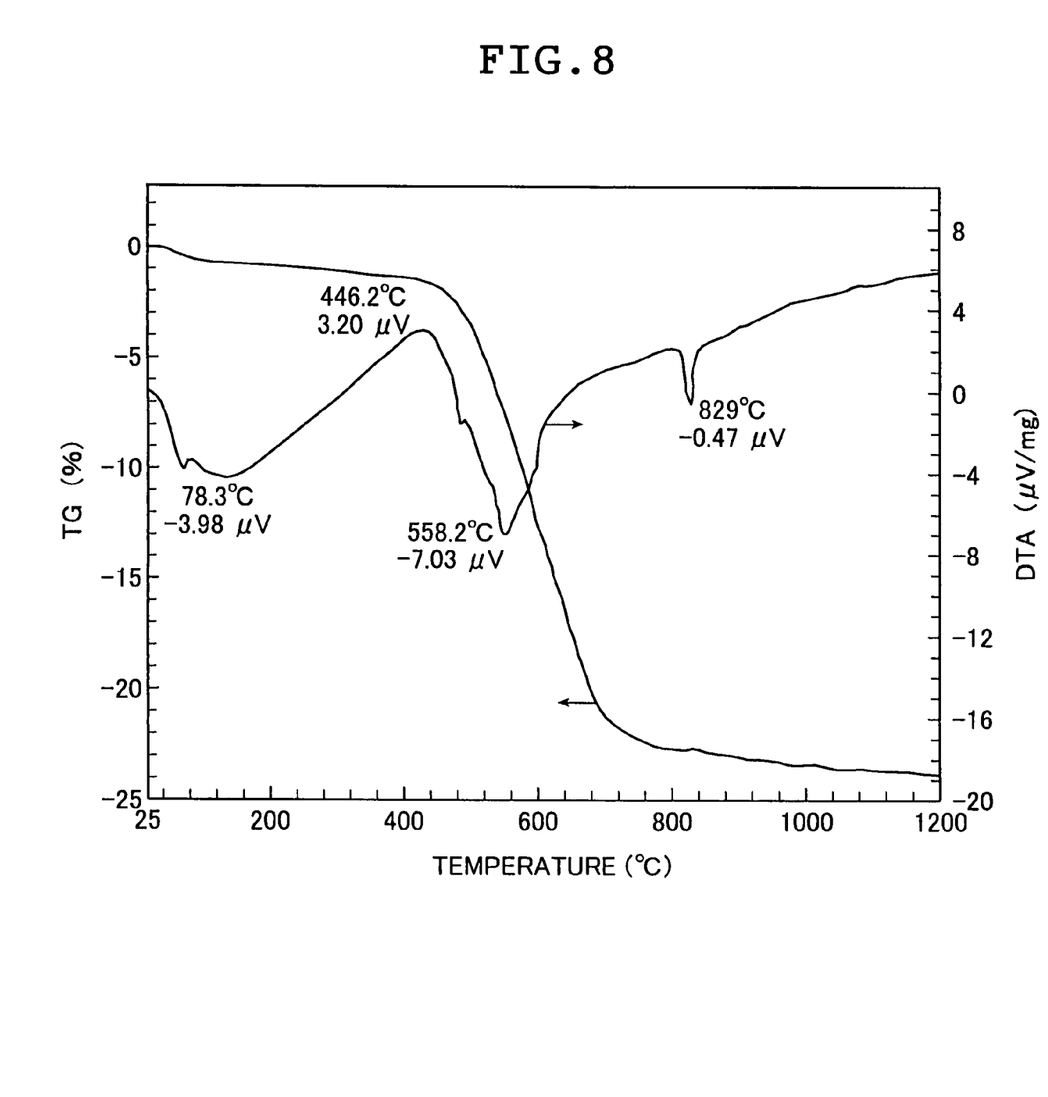
FIG. 8 shows the thermal analysis results obtained for co-milled zircon-containing ore in Example 7 according to the invention.

The loss of mass that occurs after 500° C. is due to the release of carbon dioxide from the calcium carbonate. Such release is completed at 730° C. Calcium carbonate decomposes at 825° C. The mass changes in this mixture indicate that a solid-phase reaction accompanied by the removal of carbon dioxide from the calcium carbonate proceeds from a temperature at least 190° C. lower than the decomposition temperature for calcium carbonate by itself.

TABLE 6

| | Component | | | | | |
|---|---|---|---|---|---|---|
| | Zr | Si | Fe | Ti | Al | Ca |
| Content | 49.4 | 15.3 | 0.05 | 0.09 | 0.23 | 0.02 |

Next, 100 g of the mixture of zircon-containing ore and calcium carbonate obtained by co-milling was placed in a muffle furnace and heated for 2 hours in an open-air atmosphere at 750° C., then cooled. A portion of the cooled mixture was subjected to x-ray diffraction analysis, whereupon peaks were noted for the complex oxide calcium zirconate $CaZrO_3$ and for calcium metasilicate $CaSiO_3$. When this data is considered together with the results of thermal analysis, it appears that the following solid-phase reaction proceeded to completion by 750° C.

$$ZrSiO_4 + 2CaCO_3 \rightarrow CaZrO_3 + CaSiO_3 + 2CO_2$$

Fifty grams of cooled product from the reaction of the zircon-containing ore with the calcium carbonate and 200 ml of 0.1N hydrochloric acid in water were placed in a flask and stirred with a stirrer for 30 minutes at ambient temperature, thereby dissolving and removing the calcium metasilicate and other substances. The solid thus obtained was washed four times with 0.1N hydrochloric acid, then was washed four times with pure water. A portion of this solid was subjected to x-ray diffraction analysis, from which the formation of calcium zirconate was confirmed.

COMPARATIVE EXAMPLE 1

The mixture of refined ore and sodium carbonate having a median particle size of 4.3 μm obtained by co-milling the refined ore and sodium carbonate in Example 1 was subjected, without heating, to extraction treatment with hot water. The extraction ratio was 0.24 wt %, which is very low. The surface of the extract was presumably sodium metavanadate $NaVO_3$, which is a complex oxide.

COMPARATIVE EXAMPLE 2

The refined ore having a median particle size of 32.3 μm in Example 1 was additionally milled using the vibratory mill described in Example 1, thereby yielding a ground product having a median particle size of 4.0 μm.

Next, 200 ml of water was added to 400 g of the ground refined ore and 40 g of sodium carbonate and kneading was carried out, following which the kneaded material was dried at 120° C. for 8 hours.

Figure 9:
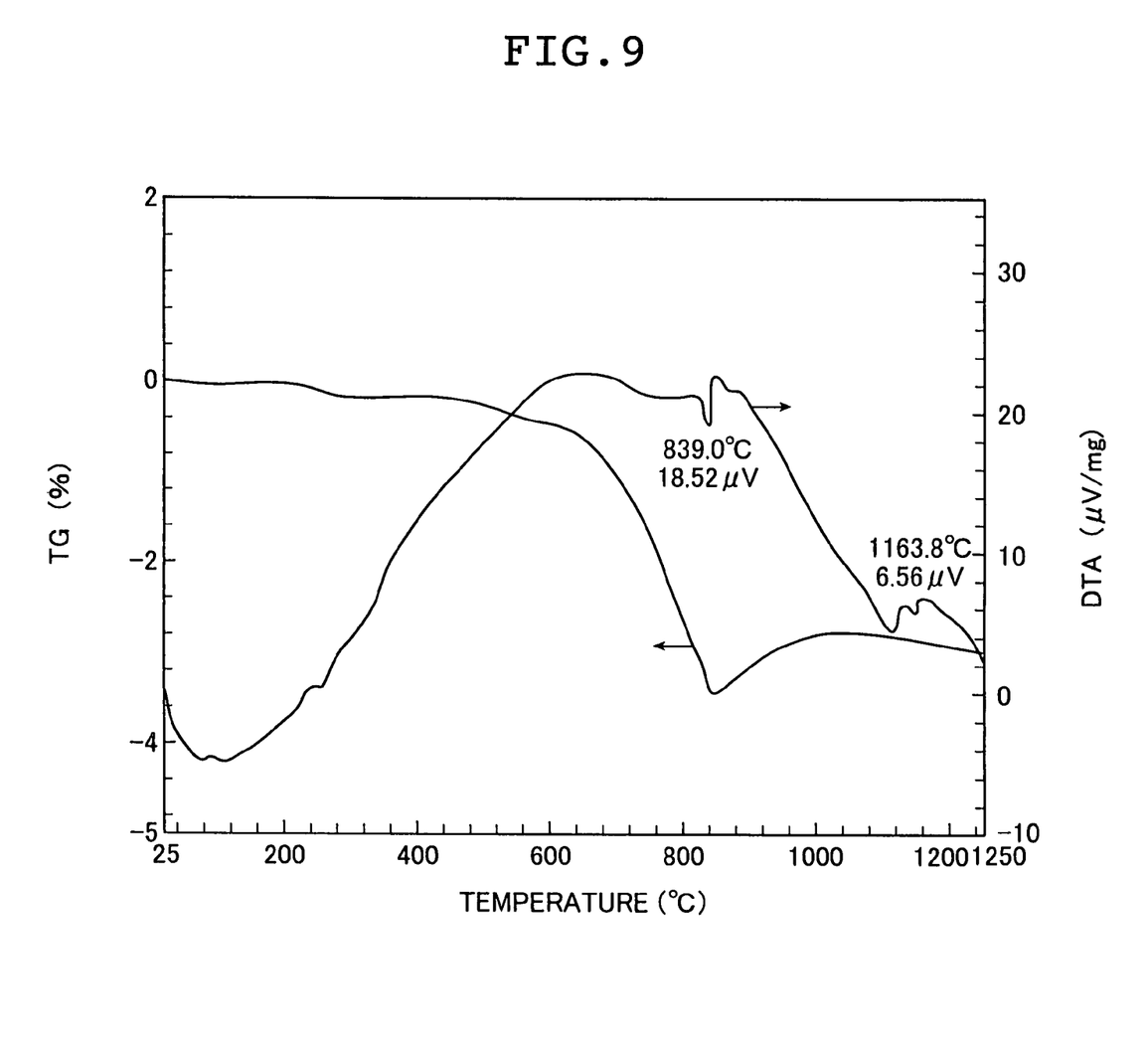
FIG. 9 shows the thermal analysis results obtained for a mixture containing vanadium-containing magnetite in Comparative Example 2 according to the invention.

The mass change for 50 mg of the kneaded product after drying was measured with a thermobalance under a 200 ml/min stream of air and at a ramp-up rate of 10 K/min. The results are shown as a plot (FIG. 9) of temperature on the x-axis versus the mass on the y-axis at left and the differential thermocouple output on the y-axis at right. From FIG. 9, it is apparent that the weight loss in the kneaded product began at 600° C. and ended at 840° C. At the same time, an endotherm appears at 839° C.

Next, 100 g of the kneaded product after drying was placed in a muffle furnace and heated for 1 hour in an open-air atmosphere at 600° C., then cooled. Fifty grams of the kneaded product after cooling and 200 ml of boiling water (pure water) were placed in a flask equipped with a condenser and stirred with a stirrer for 45 minutes while heating at 90° C. on a mantle heater, thereby carrying out extraction. Following the completion of extraction, the extract was suction filtered with 5C filter paper while still hot. The filtration residue was washed four times with boiling water. The filtrate was recovered, placed in a 250 ml graduated flask, and brought up to 250 ml by adding pure water. The extraction rate was 3.8%, which was low.

INDUSTRIAL APPLICABILITY

The present invention is able to speed up the rate of the value metal complex oxide forming reaction from a metal oxide and/or a precursor thereof, or a substance containing the metal oxide or its precursor, increase the conversion ratio, and provide a high selectivity without causing the eutectic-forming alkali metal or alkaline earth metal salt to melt, that is, without heating to an excessively high temperature. The result is excellent productivity for complex oxides of value metals. Moreover, regardless of the content of the oxides of value metals, the inventive process can efficiently isolate and recover such oxides from various kinds of base ore, industrial wastes and non-industrial wastes, and should prove highly beneficial for industrial scale production.

The invention claimed is:

1. A process for preparing a water-soluble complex oxide, the process comprising:
reacting an oxide of at least one metal selected from the group consisting of cobalt, nickel, and elements of Periodic Table groups 13, 4, 5, 6 and 7 and/or a precursor of the metal oxide, or a substance containing the metal oxide and/or precursor thereof, with an alkali metal salt and/or alkaline earth metal salt, the step of reacting further comprises:

co-milling a mixture of the metal oxide and/or a precursor thereof, or a mixture of a substance containing the metal oxide and/or a precursor thereof, with an alkali metal salt and/or alkaline earth metal salt to a median particle size for the metal oxide and/or precursor thereof, or for the metal oxide and/or precursor-containing substance, of 10 μm or less, analyzing the co-milled product by a Differential Thermal Analysis (DTA) and a Thermo Gravimetry (TG), determining a temperature to conduct a solid-phase reaction of the co-milled product, wherein the temperature is determined from a data obtained by the DTA and TG analysis of the co-milled product, heating the co-milled product to the determined temperature to conduct a solid-phase reaction, and extracting the water-soluble complex oxide from the reaction product by using an aqueous solvent, thereby recovering the water-soluble complex oxide in the aqueous solvent.

2. The process according to claim 1, wherein the metal oxide-containing substance is base ore, refined ore, incinerator ash, industrial waste, or non-industrial waste.

3. The process according to claim 1, wherein the precursor of the metal oxide is a ferroalloy, alloy, salt, or sulfate of the metal.

4. The process according to claim 1, wherein the metal in the metal oxide is vanadium, zirconium, niobium, nickel, or tungsten.

5. The process according to claim 1, wherein the alkali metal salt and/or alkaline earth metal salt is a carbonate, a halide, a sulfate, a borate, or a hydroxide.

6. The process according to claim 5, wherein the alkali metal salt and/or alkaline earth metal salt is sodium carbonate, potassium carbonate, sodium sulfate, calcium carbonate, or sodium hydroxide.

7. A process for preparing a water-soluble complex oxide, the process comprising:

reacting an oxide of at least one metal selected from the group consisting of cobalt, nickel, and elements of Periodic Table groups 13, 4, 5, 6 and 7 and/or a precursor of the metal oxide, or a substance containing the metal oxide and/or precursor thereof, with an alkali metal basic salt and/or alkaline earth metal basic salt, the step of reacting further comprises:

co-milling a mixture of the metal oxide and/or a precursor thereof, or a mixture of a substance containing the metal oxide and/or a precursor thereof, with an alkali metal basic salt and/or alkaline earth metal basic salt to a median particle size for the metal oxide and/or precursor thereof, or for the metal oxide and/or precursor containing substance, of 10 μm or less, analyzing the co-milled product by a Differential Thermal Analysis (DTA) and a Thermo Gravimetry (TG), determining a temperature to conduct a solid-phase reaction of the co-milled product, wherein the temperature is determined from a data obtained by the DTA and TG analysis of the co-milled product, heating the co-milled product to the determined temperature to conduct a solid-phase reaction, and extracting the water-soluble complex oxide from the reaction product by using an aqueous solvent, thereby recovering the water-soluble complex oxide in the aqueous solvent.

8. The process for preparing a complex oxide according to claim 1, wherein the reaction of the metal oxide and/or a precursor of the metal oxide, or a substance containing the metal oxide and/or precursor thereof, with an alkali metal salt and/or alkaline earth metal salt is carried out at a temperature of at least 250° C. but below the decomposition point or melting point, whichever is lower, of the alkali metal salt and/or alkaline earth metal salt.

9. The process for preparing a complex oxide according to claim 1, wherein the metal in the metal oxide is vanadium.

10. The process for preparing a complex oxide according to claim 1, wherein the metal in the metal oxide is zirconium.

11. The process for preparing a complex oxide according to claim 1, wherein the metal in the metal oxide is niobium.

12. The process for preparing a complex oxide according to claim 1, wherein the metal in the metal oxide is nickel.

13. The process for preparing a complex oxide according to claim 1, wherein the metal in the metal oxide is tungsten.

14. The process for preparing a complex oxide according to claim 1, wherein the alkali metal salt and/or alkaline earth metal salt is sodium carbonate.

15. The process for preparing a complex oxide according to claim 1, wherein the alkali metal salt and/or alkaline earth metal salt is potassium carbonate.

16. The process for preparing a complex oxide according to claim 1, wherein the alkali metal salt and/or alkaline earth metal salt is sodium sulfate.

17. The process for preparing a complex oxide according to claim 1, wherein the alkali metal salt and/or alkaline earth metal salt is calcium carbonate.

18. The process for preparing a complex oxide according to claim 1, wherein the alkali metal salt and/or alkaline earth metal salt is sodium hydroxide.

* * * * *